United States Patent
Schubert et al.

(10) Patent No.: US 9,706,013 B2
(45) Date of Patent: Jul. 11, 2017

(54) MOBILE RUNTIME CONDITIONAL SECTIONS FOR SURVEYS

(71) Applicant: ORACLE INTERNATIONAL CORPORATION, Redwood Shores, CA (US)

(72) Inventors: Aaron Schubert, Bozeman, MT (US); Ryan Orr, Bozeman, MT (US); Keri Leigh Jenkin, Belgrade, MT (US); Cody Wenzel, Bozeman, MT (US); Reginald Marshall Mead, Belgrade, MT (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 69 days.

(21) Appl. No.: 14/488,721

(22) Filed: Sep. 17, 2014

(65) Prior Publication Data
US 2016/0080524 A1    Mar. 17, 2016

(51) Int. Cl.
G06F 15/16 (2006.01)
G06F 13/00 (2006.01)
H04L 29/06 (2006.01)
H04L 29/08 (2006.01)

(52) U.S. Cl.
CPC ............. H04L 67/42 (2013.01); H04L 67/02 (2013.01); H04L 67/10 (2013.01); H04L 67/12 (2013.01); H04L 67/125 (2013.01)

(58) Field of Classification Search
CPC ............. H04L 29/08072; H04L 29/06; H04L 29/0809; H04L 63/08; H04L 63/102; H04N 5/44543; H04N 21/482; H04N 21/4622; H04N 21/47214; H04N 21/4821
USPC ........................................................ 709/229
See application file for complete search history.

(56) References Cited

U.S. PATENT DOCUMENTS

| | | | |
|---|---|---|---|
| 5,920,861 A * | 7/1999 | Hall | |
| 7,260,818 B1 * | 8/2007 | Iterum | G06F 8/71 717/102 |
| 7,356,470 B2 * | 4/2008 | Roth | G10L 15/26 348/515 |
| 7,716,350 B2 * | 5/2010 | Howarth | H04L 63/083 709/229 |
| 8,589,873 B2 * | 11/2013 | Baek | G06F 8/20 717/101 |

(Continued)

Primary Examiner — Mahran Abu Roumi
(74) Attorney, Agent, or Firm — Kilpatrick Townsend & Stockton LLP

(57) ABSTRACT

Embodiments of the invention provide for dynamically generating an interface including conditional content based on runtime variables related to the device on which the content will be presented. Embodiments provide for creating and using runtime variables for showing or hiding data, depending on the type of device that the interface is accessed from. In other words, embodiments allow a designer of the interface to define conditional sections within the interface and the conditions, i.e., values of the runtime variables, upon which those section should be included or excluded from the interface. Based on the definition of these sections and the runtime values of variables associated with those sections, e.g., variables representing a device type, application type, mode, etc. of a client device on which the content will be presented, embodiments can provide an interface tailored to be presented on that type of device.

14 Claims, 8 Drawing Sheets

(56) References Cited

U.S. PATENT DOCUMENTS

| | | | |
|---|---|---|---|
| 2004/0049511 A1* | 3/2004 | Yu | G06F 11/3485 |
| 2005/0200907 A1* | 9/2005 | Kitayama | G06Q 10/10 |
| | | | 358/444 |
| 2006/0053158 A1* | 3/2006 | Hall | G06F 21/10 |
| 2007/0294282 A1* | 12/2007 | Cruver | G06F 17/30911 |
| 2008/0016103 A1* | 1/2008 | Hall | G06F 21/10 |
| 2008/0034360 A1* | 2/2008 | Bodin | G06F 8/443 |
| | | | 717/154 |
| 2008/0181516 A1* | 7/2008 | Jackson | G06F 17/30557 |
| | | | 382/236 |
| 2009/0265226 A1* | 10/2009 | Martiros | G06Q 30/0255 |
| | | | 705/14.53 |
| 2011/0119079 A1* | 5/2011 | Schoenberg | G06F 19/328 |
| | | | 705/2 |
| 2012/0110616 A1* | 5/2012 | Kilar | H04N 7/17318 |
| | | | 725/32 |
| 2013/0305289 A1* | 11/2013 | Patel | H04N 5/44543 |
| | | | 725/44 |
| 2014/0047129 A1* | 2/2014 | Malec | G06F 19/322 |
| | | | 709/246 |
| 2014/0123299 A1* | 5/2014 | Jung | G06F 17/30312 |
| | | | 726/26 |
| 2015/0128124 A1* | 5/2015 | Grey | G06F 9/4443 |
| | | | 717/171 |

* cited by examiner

MOBILE RUNTIME CONDITIONAL SECTIONS FOR SURVEYS

BACKGROUND OF THE INVENTION

Embodiments of the present invention relate generally to methods and systems for dynamically tailoring content to a device upon which it will be consumed and more particularly to dynamically generating an interface including conditional content based on runtime variables related to the device on which the content will be presented.

Mobile devices of various types are increasingly used to perform the same functions and consume the same content as more traditional computing devices with larger screens or displays. While convenient to carry and use, the relatively small displays of mobile devices sometimes presents problems when a user attempts to view content that is more suited for a larger display. For example, when a user takes a survey, the survey is most often served via a web page. Surveys can contain multiple question types, such as radio button choices, or a free-form text response. Additionally, some surveys may be built with desktop capabilities, such as large images or extensive tables of data. If that survey is taken on a small-screen device, such as a mobile phone, the long text answers are difficult to answer with tiny keys, and the large images now blanket the page, forcing a scroll to get "around" that picture.

One way to deal with this problem may be to define standards or "best practices" to instruct people to not use these question types or images, but then the survey falls short or is less powerful. Other solutions may use a special <div> tag, then show or hide those using javascript or other client-executed code. However, such practices are insecure, allowing the viewable source to show both experiences. Additionally, that practice may not be a design that is followed by current or future mobile devices. Hence, there is a need for improved methods and systems for dynamically tailoring content to a device upon which it will be consumed.

BRIEF SUMMARY OF THE INVENTION

Embodiments of the invention provide systems and methods for dynamically generating an interface including conditional content based on runtime variables related to the device on which the content will be presented. According to one embodiment, dynamically generating an interface including conditional content can comprise receiving a request from a client device for a set of content, determining values for one or more variables associated with the client device, and generating the interface including the set of content. The set of content included in the interface can be determined dynamically based on the determined values for the one or more variables associated with the client device. In some cases, the interface can comprise a web page and the content can comprise a survey. The values of the variables can indicate one or more of a device type for the client device, an application executing on the client device, or a mode of the client device or application of the client device. So for example, the device type of the client device can be a mobile device type and the dynamically determined set of content for the mobile device type can be smaller than the dynamically determined set of content for another device type.

More specifically, generating the interface can comprise reading a definition of the interface. The definition can identify the content within a plurality of sections of the interface and can define the content within one or more of the sections of the interface as conditional based on the value of one or more of the variables associated with the client device. For each section of the interface, a determination can be made based on the definition of the interface as to whether the content of the section is conditional. In response to determining the content for the section is not conditional, the content of the section identified by the interface definition can be added to the generated interface. In response to determining the content for the section is conditional, a further determination can be made based on the value of the one or more of the variables associated with the client device as to whether the content of the section should be included. In response to determining the content for the section should be included, the content of the section identified by the interface definition to the generated interface. This process of selectively adding the content to the generated interface based on the definition and runtime variables, can continue for each defined section of the interface until all content identified in the interface definition has been checked and the generated interface can be provided to the client device in response to the request.

DETAILED DESCRIPTION OF THE INVENTION

Figure 1:
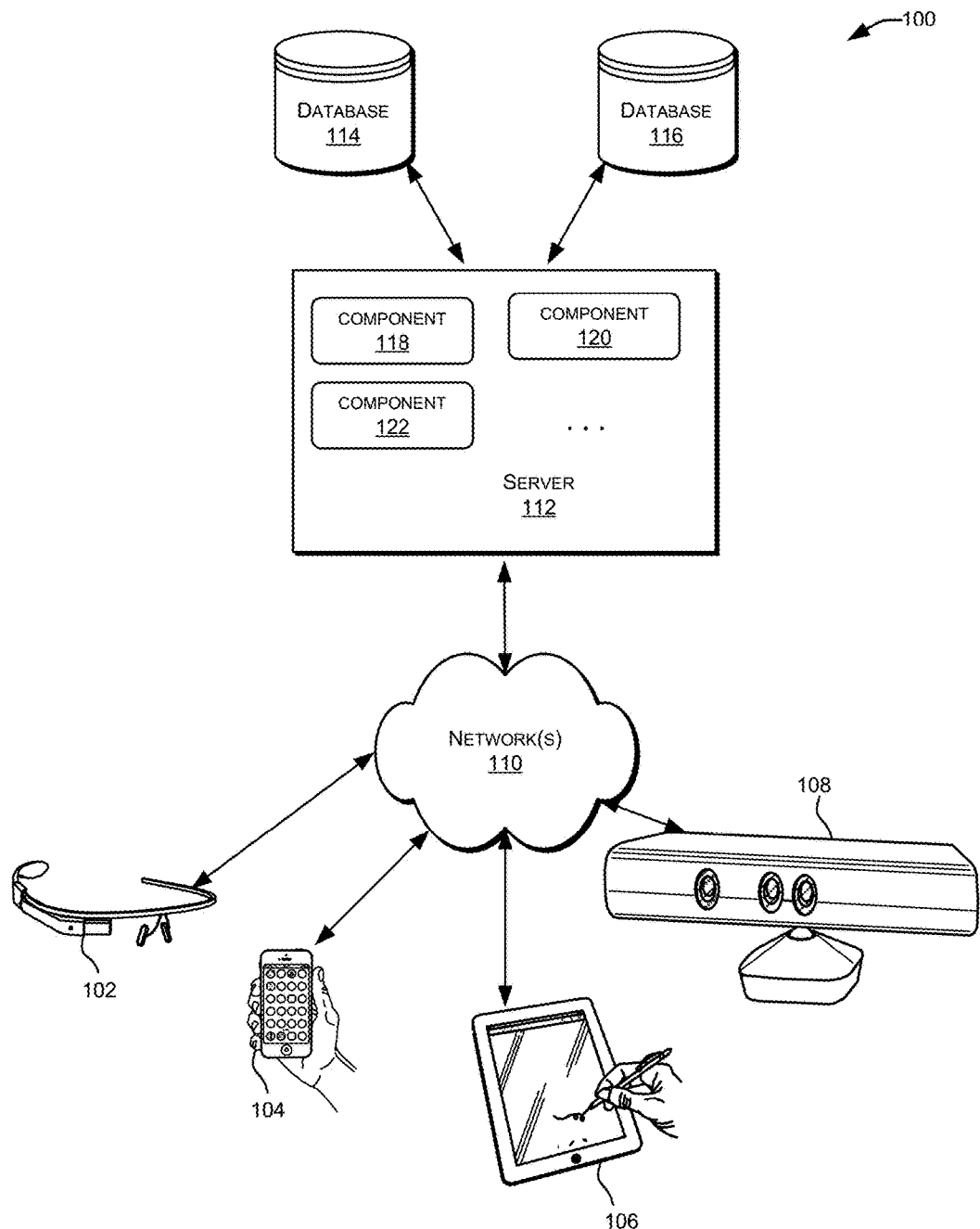
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for dynamically tailoring content to a device upon which it will be consumed. More specifically, embodiments of the invention provide systems and methods for dynamically generating an interface including conditional content based on runtime variables related to the device on which the content will be presented. Embodiments provide for creating and using runtime variables for showing or hiding data, depending on the type of device that the interface is accessed from. In other words, embodiments allow a designer of the interface to define conditional sections within the interface and the conditions, i.e., values of the runtime variables, upon which those sections should be included or excluded from the interface. Conditional sections can be defined as sections of text or other collateral that are only shown when a specific rule, or condition, is met. Case sections can be considered a logical grouping of two or more conditional sections. Based on the definition of these sections and the runtime values of variables associated with those sections, e.g., variables representing a device type, application type, mode, etc. of a client device on which the content will be presented, embodiments can provide an interface tailored to be presented on that type of device. For example, embodiments can detect a mobile device and generate an interface that shows only the applicable content that is intended for that type of experience (i.e., small device) and not other content. Various additional details of embodiments of the present invention will be described below with reference to the figures.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
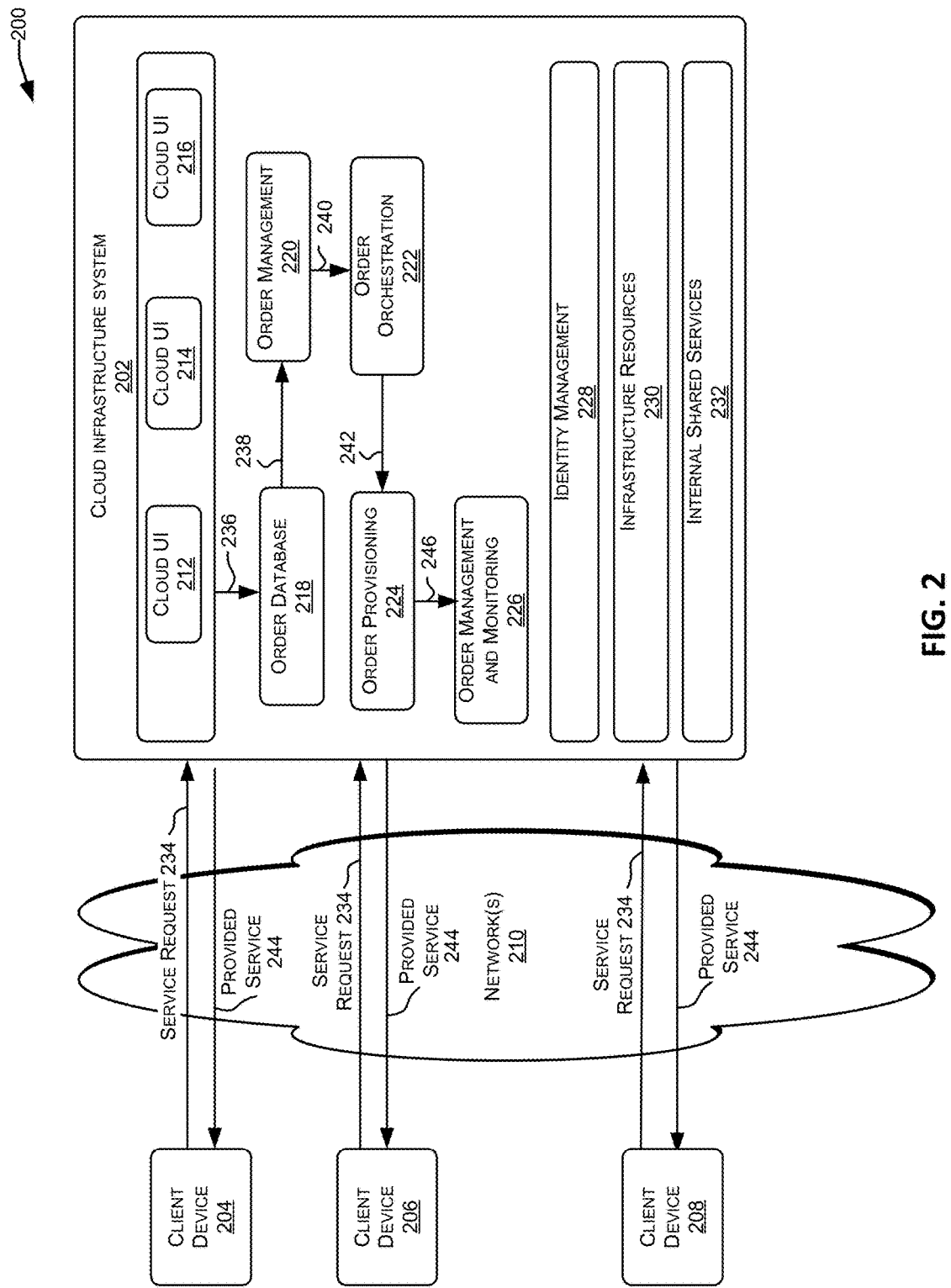
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
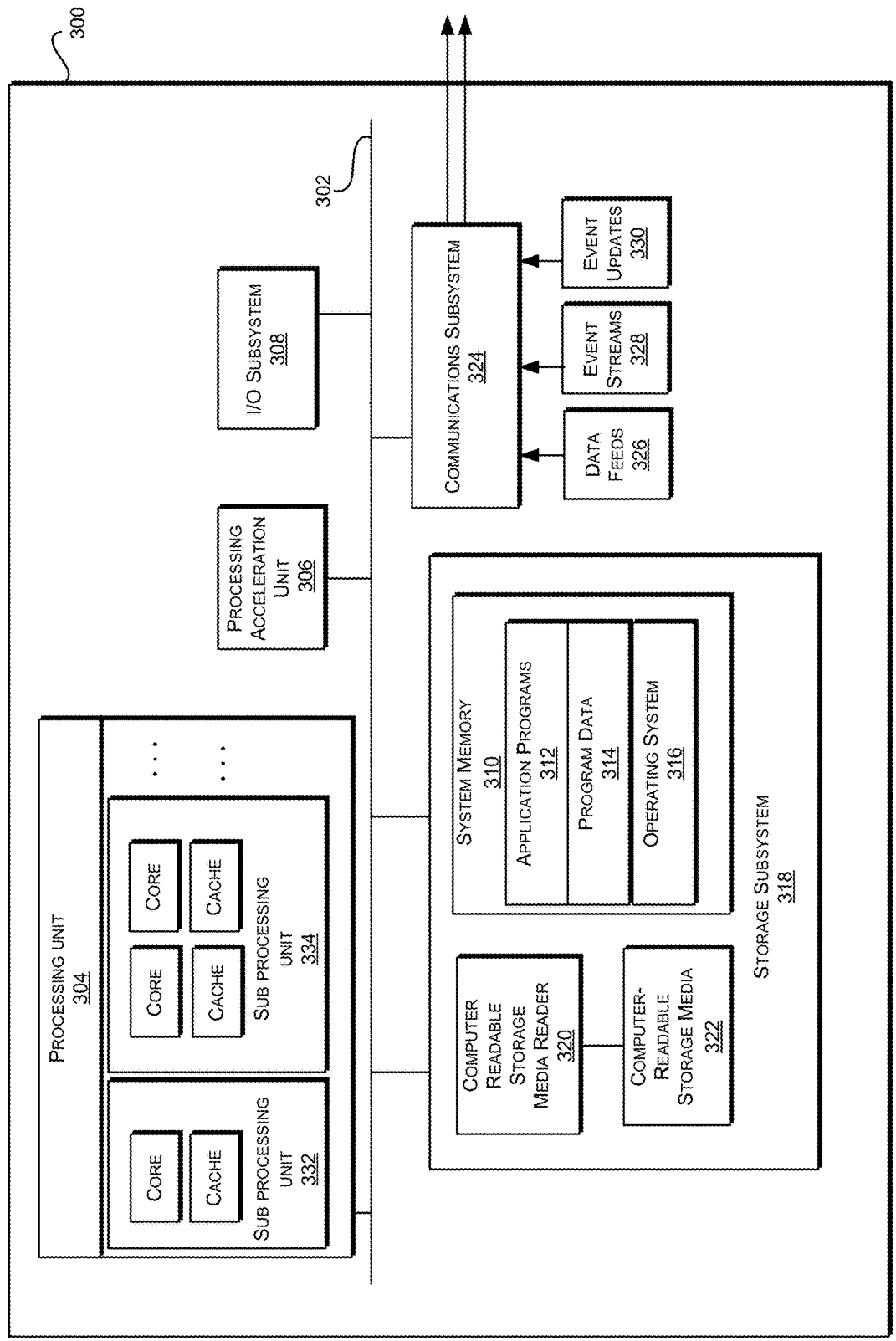
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

As introduced above, embodiments of the invention provide systems and methods for dynamically tailoring content to a device upon which it will be consumed. More specifically, embodiments of the invention provide systems and methods for dynamically generating an interface including conditional content based on runtime variables related to the device on which the content will be presented. To do so, embodiments provide for creating and using runtime variables for showing or hiding data, depending on the type of device that the interface is accessed from. In other words, embodiments allow a designer of the interface to define conditional sections within the interface and the conditions, i.e., runtime values of the variables, upon which those sections should be included or excluded from the interface. Based on the definition of these sections and the runtime values of variables associated with those sections, e.g., variables representing a device type, application type, mode, etc. of a client device on which the content will be presented, embodiments can provide an tailored to be presented on that type of device.

Figure 4:
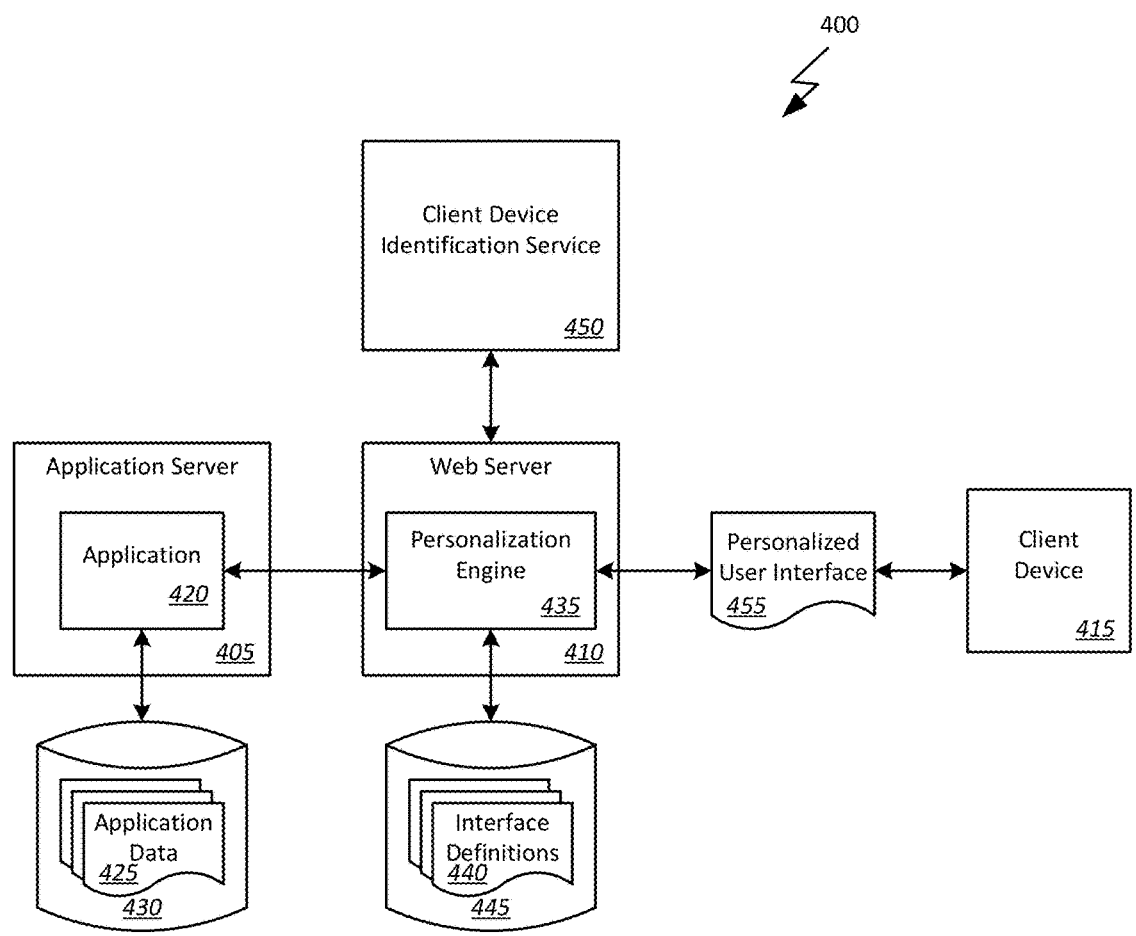
FIG. 4 is a block diagram illustrating, at a high-level, functional components of a system for dynamically generating and providing an interface including conditional content according to one embodiment of the present invention.

FIG. 4 is a block diagram illustrating, at a high-level, functional components of a system for dynamically generating and providing an interface including conditional content according to one embodiment of the present invention. In this example, the system 400 includes an application server 405 and a web server 410. As known in the art, the application server 405 can execute any of a variety of different applications or provide any number of different services while the web server 410 provides an interface to those applications 420 and/or services as well as data 425 of those application stored in one or more repositories 430.

According to one embodiment, the web server 410 can also include a personalization engine 435 for dynamically tailoring content from the application 420 in an interface 455 to a device 415 upon which it will be consumed. More specifically, the personalization engine 435 can dynamically generate an interface 455 of the application 420 including conditional content based on runtime values of variables related to the device 415 on which the content will be presented. These variables and conditional sections can be defined in a set of interface definitions 440. For example, the interface definitions 440 can comprise a set of one or more eXtensible Markup Language (XML) or other format files stored in one or more repositories 445 maintained by and/or accessible by the web server 410 and/or personalization engine 435.

At design time, a programmer or designer of the interface 455 can begin by using an editor or other tool to define the content and format or the interface 455. For example, the interface can comprise a web page and the content can comprise a survey. However, it should be understood that other types of content are contemplated and considered to be within the scope of the present invention. According to embodiments of the present invention, the programmer or designer can also identify sections within the interface 455 as being included, i.e., non-conditional, in each presentation of the interface 455 while defining other sections to be conditional, i.e., presented in the interface 455 only upon certain sets of one or more conditions. These conditions can be defined in the interface definitions 440 based on one or more variables associated with each conditional section. The definitions 440 can identify runtime values of the variables upon which inclusion of exclusion of the conditional section of the interface 455 can be determined. For example, the values of the variables may indicate one or more of a device type for the client device, an application executing on the client device, or a mode of the client device or application of the client device. Based on the values of these variables, embodiments can provide an interface tailored to be presented on a particular type of device or to a particular type of client application. For example, embodiments can detect a mobile device and/or a device with a touchscreen and generate an interface that shows only the applicable content that is intended for that type of experience (e.g., small device, touchscreen, etc.) and not other content.

More specifically, at runtime, the client device 415 can request a page or other set of content from the web server 410. In response to the request, the personalization engine 435 of the web server 410 can read the interface definitions 440 for the requested page and determine values for one or more variables associated with the client device 415 identified in the definitions. As can be understood by one skilled in the art, determining the values of these variables can based on information provided by the client device 415 in the request and/or information obtained from a service 450 providing such information.

Once the runtime values of variables defined in the interface definitions 440 have been determined by the personalization engine, e.g., the type of client device, type of application it is running, it's mode of operation, etc., is known, the personalization engine 435 can generate the interface 455. The set of content included in the interface 455 by the personalization engine 435 can be determined dynamically based on the determined values for the one or more variables associated with the client device 415. For example, if the device type of the client device 415 is a mobile device type, the dynamically determined set of content for the mobile device type can be smaller than the dynamically determined set of content for another device type based on the conditional section defined in the interface definitions 440. Additional details of exemplary processes for generating the interface 455 will be described below with reference to FIGS. 5 and 6. Once generated, the generated interface 455 can be provided by the web server 410 to the client device 415 in response to the request.

Figure 5:
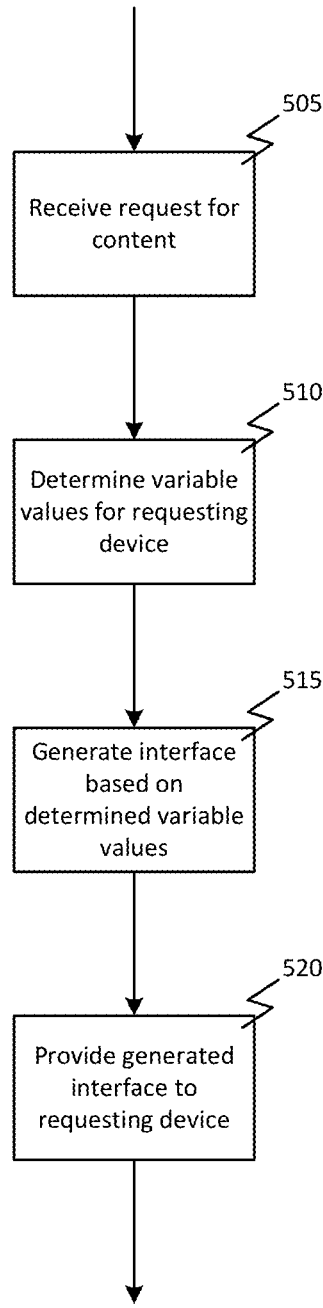
FIG. 5 is a flowchart illustrating a process for dynamically generating and providing an interface including conditional content according to one embodiment of the present invention.

FIG. 5 is a flowchart illustrating a process for dynamically generating and providing an interface including conditional content according to one embodiment of the present invention. As illustrated in this example, dynamically generating an interface including conditional content can begin with receiving 505 a request from a client device for a set of content to be provided through a user interface. For example, the interface can comprise a web page and the content can comprise a survey. In response to the request, values for one or more variables associated with the client device can be determined 510. For example, the values of the variables may indicate one or more of a device type for the client device, an application executing on the client device, or a mode of the client device or application of the client device. The interface including the set of content can then be generated 515. The set of content included in the interface can be determined dynamically based on the determined values for the one or more variables associated with the client device. For example, if the device type of the client device is a mobile device type, the dynamically determined set of content for the mobile device type can be smaller than the dynamically determined set of content for another device type. Additional details of an exemplary process for generating 515 the interface are described below with reference to FIG. 6. Once generated 515, the generated interface can be provided 520 to the client device in response to the request.

Figure 6:
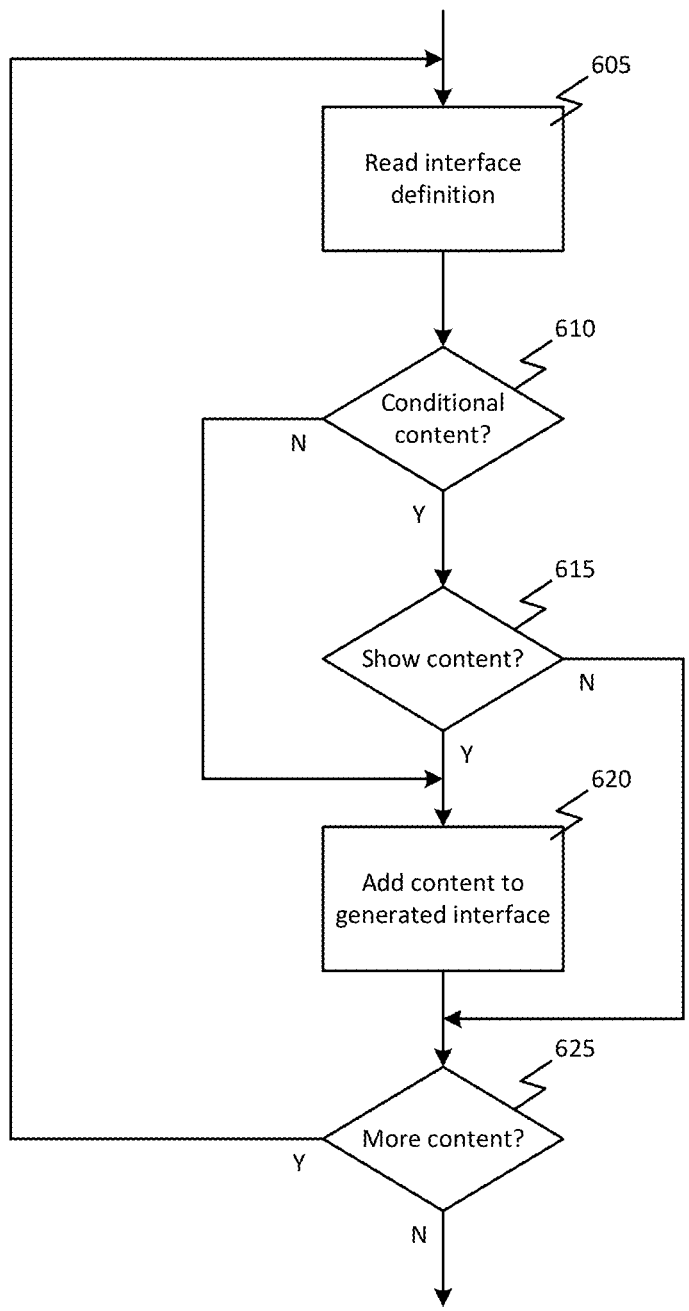
FIG. 6 is a flowchart illustrating additional details of a process for dynamically generating an interface including conditional content according to one embodiment of the present invention.

FIG. 6 is a flowchart illustrating additional details of a process for dynamically generating an interface including conditional content according to one embodiment of the present invention. As illustrated in this example, generating 515 the interface can further comprise reading 605 a definition of the interface. The definition can identify the content within a plurality of sections of the interface. The definition can also define the content within one or more of the sections of the interface as conditional based on the value of one or more of the variables associated with the client device, e.g., not presented to mobile devices. A determination 610 can be made for each section of the interface based on the definition of the interface as to whether the content of the section is conditional.

In response to determining 610 the content for the section is not conditional, the content of the section identified by the interface definition can be add 620 to the generated interface. Otherwise, in response to determining 610 the content for the section is conditional, a further determination 615 can be made based on the value of the one or more of the variables associated with the client device as to whether the content of the section should be included in the interface. In response to determining 615 the content for the section should be included, the content of the section identified by the interface definition can be added 620 to the generated interface. This process of generating the interface, i.e., reading 605 the interface definition, determining 610 whether a particular section is conditional, determining 615 whether conditional sections should be included, and selectively adding 620 the content to the generated interface based on the definition and runtime variables, can continue for each defined section of the interface until 625 all content identified in the interface definition has been checked.

To further illustrate embodiments of the present invention and to provide a more complete understanding thereof, exemplary user interfaces for implementing some of these embodiments will now be described. However, it should be understood that these examples are provided and described here only for illustrative purposes and are not intended to limit the scope of the present invention. Rather, depending upon the exact implementation, interfaces used with various embodiments can vary significantly in both form and content without departing from the scope of the present invention. Similarly, these examples are described with reference to an interface providing a survey. However, in other implementations, various other types of content may be used without departing from the scope of the present invention.

Figure 7A:
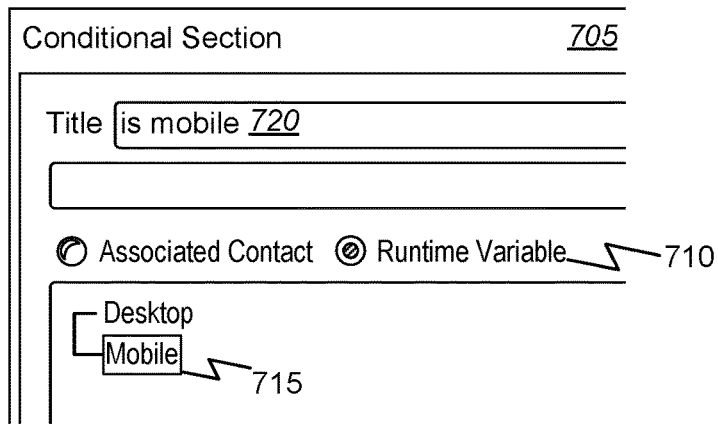
FIGS. 7A and 7B are screenshots illustrating exemplary interfaces for identifying conditional content according to one embodiment of the present invention.
Figure 7B:
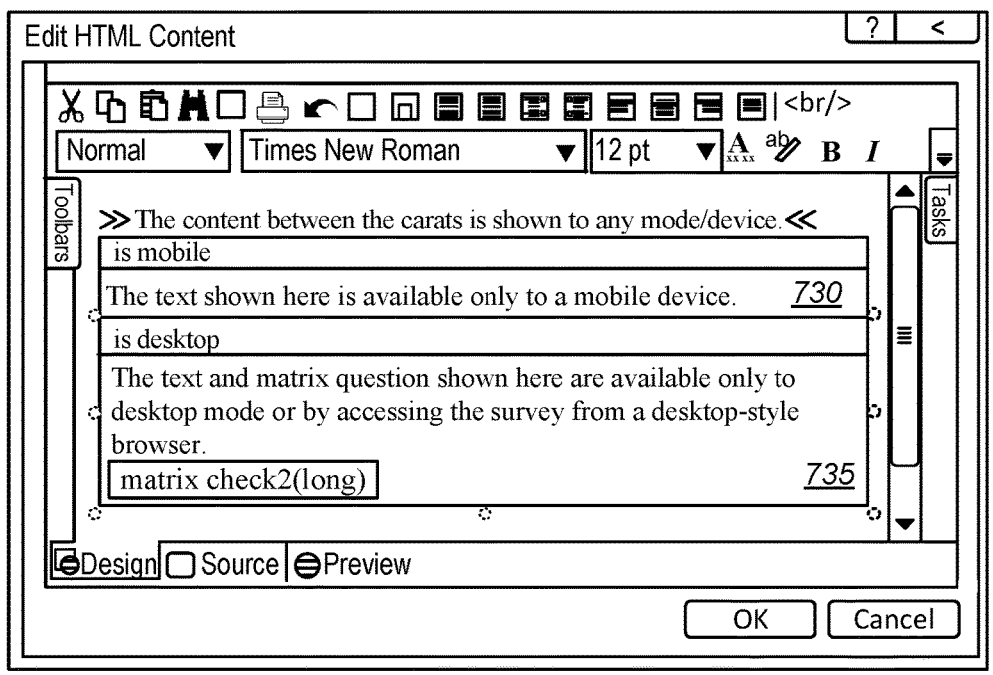

FIGS. 7A and 7B are screenshots illustrating exemplary interfaces for identifying conditional content according to one embodiment of the present invention. More specifically, these examples illustrate portions of an interface, such as an editor interface, that can be used to define content such as a survey. FIG. 7A illustrates a portion of the interface, such as a dialog 705, which may be used to define one or more conditional sections. This dialog 705 can include any of a variety of different controls through which the designer of the survey or other interface can define the conditional section by, for example, switching a radio button 710 to "Runtime Variable," selecting either "Desktop" or "Mobile" options 715 and adding an appropriate title for this section in a textbox 720. FIG. 7B illustrates a portion of the editor interface 725 through which the designer can define the content for the different conditions. For example, one textbox 730 or other set of one or more controls can be used to define the content to be presented in case the client device is a mobile device and another textbox 735 or other set of one or more controls can be used to define the content to be presented in case the client device is not a mobile device (e.g., a desktop computer) as identified by the value of the runtime variable(s). A designer may also use this capability to add an image that only appears at the top of survey pages for mobile surveys, for example. This could also be used to hide lengthy matrix questions, or other questions that might be difficult to clearly answer on a small mobile device.

Figure 8A:
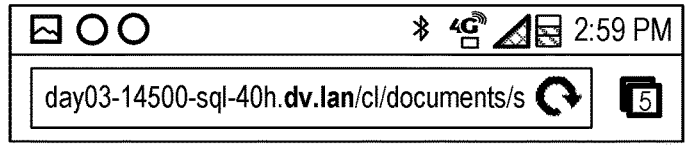
FIGS. 8A and 8B are screenshots illustrating exemplary interfaces for providing conditional content according to one embodiment of the present invention.
Figure 8B:
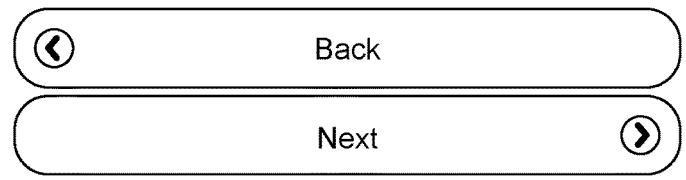

FIGS. 8A and 8B are screenshots illustrating exemplary interfaces for providing conditional content according to one embodiment of the present invention. More specifically, FIG. 8A illustrates an example of a survey as presented in an interface 805 of a mobile device including a common or unconditional section 815 provided to any device or in any mode and a conditional section 820 presented only to mobile devices. Similarly, FIG. 8B illustrates the same survey in an interface 810 presented to a desktop computer or other device other than a mobile device. This interface 810 can include the same common or unconditional section 815 provided to any device or in any mode as well as a conditional section 825 presented only to desktops or other devices other than a mobile devices. As noted above, if the end user is using a mobile device but explicitly chooses to switch to "Desktop Mode" at the beginning of the survey, content shown can be the desktop content, even if they are taking the survey from their mobile device.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for dynamically generating an interface including conditional content, the method comprising:
   receiving an interface definition of a set of content comprising a survey, the interface definition of the set of content comprising a plurality of sections, a first section of the plurality of sections having a first content of the set of content defined as not conditional and a second section of the plurality of sections having a second content of the set of content defined to display conditionally based upon a first runtime variable associated with a requesting client device;
   receiving a request from a client device for the set of content;
   reading the interface definition for the set of content;
   generating the interface, wherein generating the interface comprises:
      determining for each section of the plurality of sections of the interface based on the interface definition whether a content associated with the section is conditional, and
      for each conditional section:
         determining a section variable on which the content associated with the section is conditional,
         determining a value for the section variable,
         dynamically determining, based on the determined value for the section variable, whether to include the content associated with the section in the interface, and
         adding the content associated with the section to the interface if the dynamically determining operation determined to include the content, and wherein:
            the first content is included in the interface,
            determining the value for the section variable of the second section comprises determining a runtime value for the first runtime variable associated with the client device,
            dynamically determining whether to include the content associated with the second section comprises dynamically determining, based on the runtime value, whether to display the second content, and
            the second content is not included in the interface if the dynamically determining operation determined to not display the second content and the second content is included in the interface if the dynamically determining operation determined to display the second content; and providing the generated interface to the client device in response to the request.

2. The method of claim 1, further comprising:
for each section determined to be not conditional, adding the content associated with the section to the interface.

3. The method of claim 1, wherein the interface comprises a web page.

4. The method of claim 3, wherein the runtime value of the first runtime variable indicates one or more of a device type for the client device, an application executing on the client device, or a mode of the client device or application of the client device.

5. The method of claim 4, wherein the device type of the client device is a mobile device type and wherein the dynamically determined set of content for the mobile device type is smaller than the dynamically determined set of content for another device type.

6. A system comprising:
a processor; and
a memory coupled with and readable by the processor and storing therein a set of instructions which, when executed by the processor, causes the processor to dynamically generate an interface including conditional content by:
receiving an interface definition of a set of content comprising a survey, the interface definition of the set of content comprising a plurality of sections, a first section of the plurality of sections having a first content of the set of content defined as not conditional and a second section of the plurality of sections having a second content of the set of content defined to display conditionally based upon a first runtime variable associated with a requesting client device;
receiving a request from a client device for the set of content;
reading the interface definition for the set of content;
generating the interface, wherein generating the interface comprises:
determining for each section of the plurality of sections of the interface based on the interface definition whether a content associated with the section is conditional, and
for each conditional section:
determining a section variable on which the content associated with the section is conditional,
determining a value for the section variable,
dynamically determining, based on the determined value for the section variable, whether to include the content associated with the section in the interface, and
adding the content associated with the section to the interface if the dynamically determining operation determined to include the content, and wherein:
the first content is included in the interface,
determining the value for the section variable of the second section comprises determining a runtime value for the first runtime variable associated with the client device,
dynamically determining whether to include the content associated with the second section comprises dynamically determining, based on the runtime value, whether to display the second content, and the second content is not included in the interface if the dynamically determining operation determined to not display the second content and the second content is included in the interface if the dynamically determining operation determined to display the second content; and providing the generated interface to the client device in response to the request.

7. The system of claim 6, further comprising:
for each section determined to be not conditional, adding the content associated with the section to the interface.

8. The system of claim 6, wherein the interface comprises a web page.

9. The system of claim 8, wherein the runtime value of the first runtime variable indicates one or more of a device type for the client device, an application executing on the client device, or a mode of the client device or application of the client device.

10. The system of claim 9, wherein the device type of the client device is a mobile device type and wherein the dynamically determined set of content for the mobile device type is smaller than the dynamically determined set of content for another device type.

11. A computer-readable memory comprising a set of instructions stored therein which, when executed by a processor, causes the processor to dynamically generate an interface including conditional content by:
receiving an interface definition of a set of content comprising a survey, the interface definition of the set of content comprising a plurality of sections, a first section of the plurality of sections having a first content of the set of content defined as not conditional and a second section of the plurality of sections having a second content of the set of content defined to display conditionally based upon a first runtime variable associated with a requesting client device;
receiving a request from a client device for the set of content;
reading the interface definition for the set of content;
generating the interface, wherein generating the interface comprises:
determining for each section of the plurality of sections of the interface based on the interface definition whether a content associated with the section is conditional, and
for each conditional section:
determining a section variable on which the content associated with the section is conditional,
determining a value for the section variable,
dynamically determining, based on the determined value for the section variable, whether to include the content associated with the section in the interface, and
adding the content associated with the section to the interface if the dynamically determining operation determined to include the content, and wherein:
the first content is included in the interface,
determining the value for the section variable of the second section comprises determining a runtime value for the first runtime variable associated with the client device,
dynamically determining whether to include the content associated with the second section comprises dynamically determining, based on the runtime value, whether to display the second content, and the second content is not included in the interface if the dynamically determining operation determined to not display the second content and the second content is included in the interface if the dynamically determining operation determined to display the second content; and providing the generated interface to the client device in response to the request.

12. The computer-readable memory of claim 11, further comprising:

for each section determined to be not conditional, adding the content associated with the section to the interface.

13. The computer-readable memory of claim 11, wherein the interface comprises a web page and wherein the runtime value of the first runtime variable indicates one or more of a device type for the client device, an application executing on the client device, or a mode of the client device or application of the client device.

14. The computer-readable memory of claim 13, wherein the device type of the client device is a mobile device type and wherein the dynamically determined set of content for the mobile device type is smaller than the dynamically determined set of content for another device type.

* * * * *